United States Patent [19]

Erwin

[11] 4,131,055
[45] Dec. 26, 1978

[54] NOISE REDUCING CONTROL VALVE FOR A HYDRAULIC BRAKE BOOSTER

[75] Inventor: Louis R. Erwin, Livonia, Mich.

[73] Assignee: The Bendix Corporation, Southfield, Mich.

[21] Appl. No.: 765,322

[22] Filed: Feb. 3, 1977

[51] Int. Cl.² .................. F15B 9/10; F16K 47/00; F16L 55/02
[52] U.S. Cl. .................................. 91/378; 251/122; 137/625.68; 137/625.69
[58] Field of Search ................. 91/378, 431, 391, 49, 91/396; 251/121, 122, 324; 137/625.68, 625.69

[56] References Cited

U.S. PATENT DOCUMENTS

| 476,228 | 5/1892 | Hamilton | 137/625.69 |
|---|---|---|---|
| 2,007,423 | 7/1935 | Davis | 91/431 |
| 3,503,585 | 3/1971 | Vogeli | 251/121 |
| 3,719,044 | 3/1973 | Bach | 91/391 R |
| 3,945,301 | 3/1976 | Buente et al. | 91/391 R |
| 3,961,561 | 6/1976 | Knutson | 91/431 |

FOREIGN PATENT DOCUMENTS 447198  5/1936  United Kingdom ............... 137/625.69

*Primary Examiner*—Paul E. Maslousky
*Attorney, Agent, or Firm*—Paul David Schoenle; Ken C. Decker

[57] ABSTRACT

A hydraulic brake booster operatively connects with a pressurized fluid source and a master brake cylinder to convert the pressure within the pressurized fluid source to a power assist to the master brake cylinder during a brake application. The booster includes a cylindrical housing defining a bore and a piston is slidably mounted in the bore to define a pressure chamber and to operatively connect with the master brake cylinder. A valve member is slidably disposed within a bore within the piston and is movable upon a brake application to communicate the pressurized fluid source to the pressure chamber which urges the piston into engagement with the master brake cylinder. In a rest position inlet and outlet openings on the piston communicate fluid through the piston without any transfer of the force within the pressurized fluid to the piston. Upon movement of the valve member, a land on the valve member cooperates with the piston bore to restrict communication between the inlet and outlet openings which concurrently increases the communication to the pressure chamber and increases the pressure therein. Consequently, the piston is pressure responsive to move relative to the housing to engage the master brake cylinder to assist in a brake application. The valve member land includes a first diameter portion and second diameter portion and a recess between the portions to cooperate with the piston bore to quietly restrict the communication between the inlet and outlet openings.

10 Claims, 5 Drawing Figures

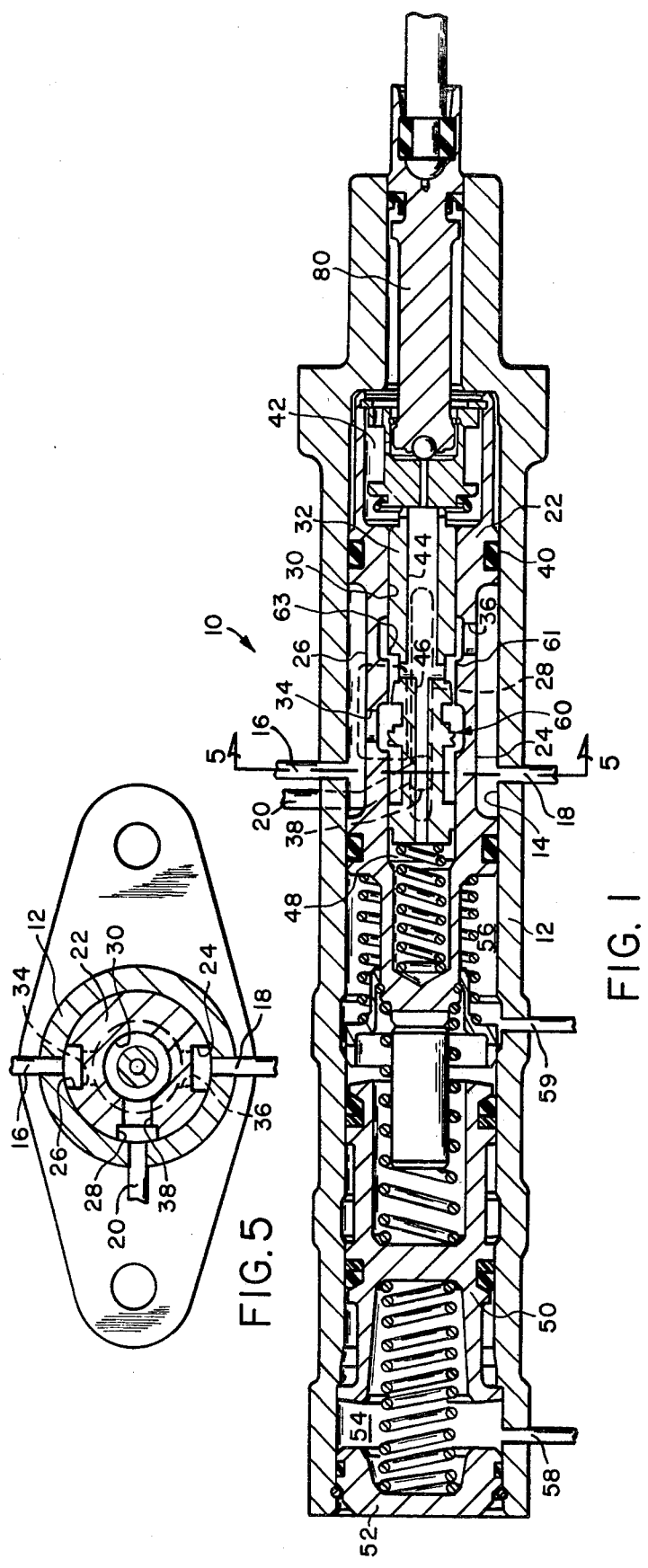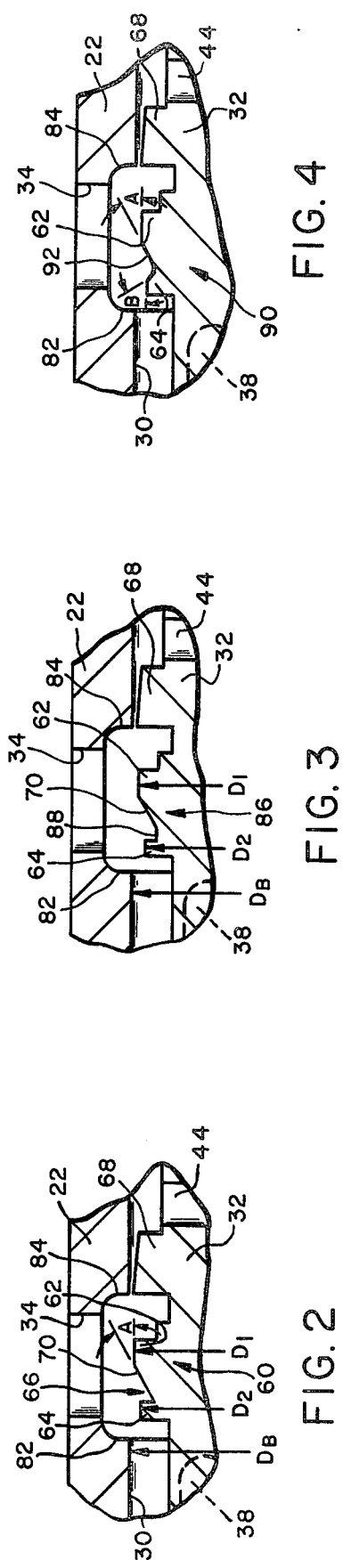

NOISE REDUCING CONTROL VALVE FOR A HYDRAULIC BRAKE BOOSTER

BACKGROUND OF THE INVENTION

In a hydraulic brake booster a piston is slidably mounted within a housing and is pressure responsive to move relative to the housing whereby the piston operatively engages a brake master cylinder to effectuate a brake application. In order to move the piston into engagement with the master cylinder, the piston cooperates with the housing bore to form a pressure chamber. The piston includes inlet and outlet openings for communicating fluid therethrough and a valve member is slidably mounted within a bore on the piston to communicate fluid to the pressure chamber which pressure urges the piston into engagement with the master brake cylinder to effectuate a brake application.

The valve member includes a land which cooperates with the piston bore to communicate the inlet opening with the pressure chamber when an operator actuator is actuated to move the valve member within the piston bore. Consequently, the valve member land operates as a metering valve controlling high pressure flow to the pressure chamber. As a result, a substantial pressure drop occurs across the land which generates an undesirable audible noise.

It is desirable to provide a hydraulic brake booster with a valve member that is slidably mounted within the piston bore to communicate pressurized fluid to the pressure chamber and that is also provided with a metering land which cooperates with the piston bore to quietly communicate the pressurized fluid to the pressure chamber.

SUMMARY OF THE INVENTION

The present invention provides a hydraulic brake booster with a valve member that includes a metering land which quietly restricts the flow through the piston in order to communicate the flow to a pressure chamber. The metering land includes a first diameter portion, a second diameter portion and a recess between the portions. The valve member is movable upon actuation of an operator actuator to position the second diameter portion within the piston bore between an inlet and an outlet opening to restrict the flow therebetween. Moreover, the valve member is movable to position the second diameter portion and the recess within the bore between the inlet and outlet openings. In this position the restricted flow from the inlet opening to the outlet opening strikes the back of the second diameter portion to experience a static pressure recovery before continuing to the outlet opening. As the valve member moves further, the first diameter portion also cooperates with the piston bore to restrict the flow between the inlet and outlet openings.

In the preferred embodiment of the present invention, the first diameter portion is larger in diameter than the second diameter portion and smaller in diameter than the piston bore diameter so taht a constant area metering land is provided. The recess comprises a frusto conical surface tapering radially outwardly from the second diameter portion to the first diameter portion. The angle of the taper for the frusto conical surface is about 30°.

In a modification of the present invention, the recess includes a cylindrical surface between the second diameter portion and the frusto conical surface. Moreover, a second modification provides a curved surface for the recess with the curved surface adjoining the first diameter portion at an angle substantially equal to or less than 60° and adjoining the second diameter portion at an angle substantially equal to or greater than 70° relative to the valve member.

It is an important object of this invention to provide a metering orifice in a hydraulic brake booster which quietly restricts the flow of fluid through the booster.

BRIEF DESCRIPTION OF THE DRAWINGS

FIG. 1 is a cross-sectional view of a hydraulic brake booster;

FIG. 2 is an enlarged view of the encircled portion of FIG. 1;

FIG. 3 is similar to the view of FIG. 2 and illustrates a modification of the present invention; and FIG. 4 is similar to the view of FIG. 2 and illustrates another modification of the present invention.

DETAILED DESCRIPTION

With reference to the drawings, wherein like numerals refer to similar components, a hydraulic brake booster is illustrated in FIG. 1 by the numeral 10. The brake booster 10 includes a cylindrical housing 12 with a longitudinal bore 14 therethrough. The housing 12 is adapted for attachment to an engine compartment firewall and is provided with an inlet port 16 communicating with a pressurized fluid source (not shown), a return port 18 communicating with a reservoir attached to the pressurized fluid source and an outlet port 20 communicating with a steering gear assembly (not shown).

A piston 22 is slidably mounted within the housing bore 14 and includes axial slots 24, 26 and 28 that are connected respectively with return port 18, inlet port 16 and outlet port 20. A bore 30 within the piston 22 slidably receives a valve member 32. An inlet opening 34, a return opening 36 and an outlet opening 38 on the piston 22 communicate with the bore 30 and with respective piston slots 26, 24, and 28. Consequently, pressurized fluid is communicated through the hydraulic brake booster via inlet port 16, slot 26, inlet opening 34, bore 30, outlet opening 38, slot 28 and outlet port 20. In the position shown in FIG. 1 chamber 42 communicates via a passage 44 and opening 36 to return port 18 and only leakage flow via land 68 reaches chamber 42. Thus, chamber 42 is at essentially return port pressure.

The piston 22 carries a sealing ring 40 which cooperates with the housing bore 14 to define a pressure chamber 42 at one end of the housing bore 14. A passage 44 extending through the valve member 32 communicates the bore 30 with the pressure chamber 42 and also, via a reduced diameter branch 46, with a compensating chamber 48. The other end of the housing bore 14 slidably receives a partition member 50 which cooperates with the piston 22 and an end plug 52 to define a pair of master brake cylinder chambers 54 and 56. The chambers 54 and 56 communicate via respective ports 58 and 59 to hydraulic cylinders associated with the front and rear wheels of a motor vehicle as is well known in the art.

Turning to FIG. 2, the valve member 32 is provided with a metering land 60 for controlling the flow of fluid from the inlet opening 34 to the outlet opening 38. The metering land 60 includes a first diameter portion 62, a second diameter portion 64 and a recess 66 therebetween. The diameter D1 of the first portion 62 is greater than the diameter D2 of the second portion 64, while the diameter DB of the piston bore 30 is greater than the diameter D1 of the first portion 62 so that when the first portion 62 is telescoped within the bore 30 to the left of inlet opening 34 constant area restriction of flow to the outlet opening 38 is maintained, albeit substantially restricted.

As the source of fluid flow via inlet port 16 is essentially constant, flow restriction and pressure variations in opening 34 and in connected chambers occur as soon as diameter portion 64 approaches edge 82.

The diameter portion 64 is computed such that when the diameter portion 64 is fully telescoped into bore 30, the maximum resulting pressure drop is a value known to be acceptable from a noise generation standpoint. When ramp 70 and diameter portion 62 approach edge 82, causing additional total restriction, the total pressure drop from opening 34 to bore 30 takes place in two steps and by proper proportioning, the ratio of upstream to downstream pressure for each drop can be kept to a value established by test for a particular fluid to be acceptable. The mechanism is believed to suppress fluid cavitation by controlling the maximum dynamic pressure reduction experienced in the pressure-drop restricted area, while also avoiding other noise mechanisms, such as edge tones.

While this flow area is being restricted, edges 61 and 63 close off communication from chamber 42 via passage 44 and opening 36 to return port 18. Also, the area controlled by a second metering land 68 gradually increases, allowing pressure buildup in chamber 42, since only a small flow is needed even when piston 22 moves to the left to operate the master cylinder mechanism, the tapered diameter for the second metering land 68 avoids noise due to that flow (whereas a similar taper in place of the disclosed two-step orifice using D2 and D1 could not provide enough flow area in the stroke available).

In the preferred embodiment of the invention, the recess 66 is provided by a frusto conical surface 70 extending from the second diameter portion 64 to the first diameter portion 62. The surface 70 is tapered to form an angle A with the axis of the valve member 32 of about 30°.

MODE OF OPERATION

An operator actuator 80 is operatively connected to a brake pedal (not shown) for movement into the housing bore when the operator steps on the brake pedal. During nonoperation and brake inactivity the valve member 32 is positioned within the housing bore as illustrated in FIG. 2 so that fluid communicates from the inlet opening 34 to the outlet opening 38 without any restriction while very little fluid communicates from the inlet opening 34 to the passage 44 and return opening 36 via the restricted path between the second metering land 68 and the bore 30.

When the operator steps on the brake pedal, the operator actuator 80 engages the valve member 32 to move the same to the left viewing the Figures. Consequently, the second diameter portion 64 telescopes into the bore 30 near the corner 82 to provide a restricted orifice through which some fluid passes while the pressure upstream of this orifice increases. Movement of the valve member to the left also closes the return opening 36 and moves the second metering land 68 to the left of corner 84. As the second metering land is slightly tapered, the restriction of flow to outlet opening 38 is accompanied by an opening of the restriction between the second metering land 68 and the bore 30 to permit the communication of increased pressure to the pressure chamber 42. When the metering land 60 is disposed to the left of corner 82 the fluid passing through the restricted orifice flows partially parallel to the surface 70 to abut the back side of the second diameter portion 64. This provides a change in the direction of flow for the fluid which causes a pressure recovery before the fluid continues flowing between the second diameter portion 64 and the bore 30.

Communication of pressurized fluid to pressure chamber 42 urges the piston 22 to the left which, in turn, reduces the volume of chambers 54 and 56 to compress the fluid medium therein. This compression of chambers 54 and 56 increases the pressure in each chamber and communicates this increased pressure to the hydraulic cylinders at the front and rear wheels to effectuate braking.

In the modification of FIG. 3, the metering land 86 is provided with a cylindrical surface 88 between the second diameter portion 64 and the frusto conical surface 70. This embodiment operates in substantially the same manner as the embodiment of FIGS. 1 and 2.

In the embodiment of FIG. 4 the valve member 32 includes a metering land 90 which includes a continuous curved surface 92 between the first diameter portion 62 and the second diameter portion 64. The curved surface 92 is substantially concave and adjoins the portions 62 and 64 to form angles A and B. In order to direct flow along the curved surface, and to abut the fluid flow against the back side of the second diameter portion 64, the angle A is preferably equal to or less than 60° and the angle B is preferably equal to or greater than 70° relative to the longitudinal axis of the valve member 32.

Thus, it is apparent that the present invention provides a hydraulic brake booster wherein a metering land cooperates with a piston to quietly control the flow of fluid through the hydraulic brake booster. In particular, the metering land includes a first diameter portion, a second diameter portion and a recess therebetween to quietly restrict the flow between the piston and the metering land.

I claim:
1. A control valve for a hydraulic booster comprising:
   a housing having a bore therein and inlet and outlet ports communicating with the bore;
   a piston slidably mounted in said bore, said piston having a bore therein communicating with the inlet port and the outlet port through openings on the piston, said piston forming a pressure chamber with the housing bore and cooperating with means for actuating a brake application upon movement of said piston within the housing bore;
   a valve member slidably mounted within said piston bore, said valve member being movable within said piston bore upon a brake application to restrict the communication between said inlet and outlet ports and to open the communication between said inlet port and the pressure chamber to move said piston within said housing bore;
   said valve member including a land cooperating with said piston bore to restrict the communication between said inlet and outlet ports, said land including a first diameter portion, a second diameter portion and a recess between the first and second diameter portions, said first diameter portion having a larger diameter than said second diameter portion, said second diameter portion and said recess cooperating with said piston bore to restrict the communication between said inlet and said outlet ports.

2. The control valve of claim 1 in which said recess comprises a frusto conical surface extending from said second diameter portion to said first diameter portion at an angle of about 30° relative to said valve member.

3. The control valve of claim 1 in which said recess comprises a cylindrical groove adjacent said second diameter portion and a frusto conical surface extending from said cylindrical groove to said first diameter portion at an angle of about 30° relative to said valve member.

4. The control valve of claim 1 in which said recess comprises a substantially curved surface, said curved surface adjoining said first diameter portion at an angle substantially equal to or less than 60° and adjoining said second diameter portion at an angle substantially equal to or greater than 70° relative to said valve member.

5. In a piston member having a bore therein and an inlet opening and an outlet opening for communicating fluid through said piston, a valve member slidably mounted in said bore, said valve member including a land cooperating with said piston bore to restrict the communication between the inlet and outlet openings, said land having a first diameter portion, a second diameter portion and a recess between said first and second diameter portions, said first diameter portion having a larger diameter than said second diameter portion, said valve member being movable relative to said piston bore to position said second diameter portion in cooperation with said piston bore to restrict communication between the inlet and outlet openings and said valve member being movable to position said second diameter portion and said recess in cooperation with said piston bore to restrict the communication between the inlet and outlet openings.

6. The piston member of claim 5 in which said valve member is movable to position said second diameter portion, said recess and said first diameter portion in cooperation with said piston bore to restrict the communication between the inlet and outlet openings and said recess includes a tapered surface portion having a generally increasing diameter from said second diameter portion to said first diameter portion.

7. The piston member of claim 5 in which said recess comprises a substantially frusto conical surface extending from said second diameter portion to said first diameter portion at an angle of about 30° relative to said valve member.

8. The piston member of claim 5 in which said recess comprises a cylindrical groove adjacent said second diameter portion and a frusto conical surface extending from said cylinder groove to said first diameter portion at an angle of about 30° relative to said valve member.

9. The piston member of claim 5 in which said recess comprises a substantially curved surface, said curved surface adjoining said first diameter portion at an angle substantially equal to or less than 60° and adjoining said second diameter portion at an angle substantially equal to or greater than 70° relative to said valve member.

10. A control valve for a hydraulic brake booster comprising a housing having a bore for communicating fluid through the booster, a piston slidably mounted in the housing bore and having a bore, a valve member slidably mounted in the piston bore and cooperating therewith to restrict the flow of fluid through the hydraulic brake booster, said valve member including a land cooperating with the piston bore to restrict the flow of fluid therethrough and said land including a first diameter portion, a second diameter portion and a recess therebetween to direct the flow of fluid from the first diameter portion to the second diameter portion within the recess so that the fluid contacts the side of the second diameter portion adjoining the recess before it passes between the piston bore and the second diameter portion.

* * * * *